US006552650B1

(12) United States Patent
Gokcebay et al.

(10) Patent No.: US 6,552,650 B1
(45) **Date of Patent: *Apr. 22, 2003**

(54) COIN COLLECTION LOCK AND KEY

(76) Inventors: Asil T. Gokcebay, 703 Market St., San Francisco, CA (US) 94103; Yucel K. Keskin, 3667 Magellan, Santa Clara, CA (US) 95051

( * ) Notice: Subject to any disclaimer, the term of this patent is extended or adjusted under 35 U.S.C. 154(b) by 0 days.

This patent is subject to a terminal disclaimer.

(21) Appl. No.: 08/705,843

(22) Filed: Aug. 30, 1996

Related U.S. Application Data

(63) Continuation-in-part of application No. 08/342,846, filed on Nov. 21, 1994, now Pat. No. 5,552,777, which is a continuation-in-part of application No. 07/836,206, filed on Feb. 14, 1992, now Pat. No. 5,367,295.

(51) Int. Cl.[7] ............................ E05B 49/00; G06K 5/00
(52) U.S. Cl. ...................................... 340/5.65; 340/5.73
(58) Field of Search ......................... 340/825.31, 825.3, 340/825.35, 5.65, 5.73, 5.9; 70/278, 278.2; 361/172; 194/350

(56) References Cited

U.S. PATENT DOCUMENTS

| | | | | |
|---|---|---|---|---|
| 480,299 A | | 8/1892 | Voight | |
| 550,111 A | | 11/1895 | Sargent | |
| 564,029 A | | 7/1896 | Sargent | |
| 3,208,248 A | | 9/1965 | Tornoe | |
| 3,733,862 A | | 5/1973 | Killmeyer | |
| 3,797,936 A | | 3/1974 | Dimitriadia | |
| 4,144,523 A | | 3/1979 | Kaplit | |
| 4,209,782 A | | 6/1980 | Donath et al. | |
| 4,257,030 A | | 3/1981 | Bruhin et al. | |
| 4,326,124 A | | 4/1982 | Favde | |
| 4,562,712 A | | 1/1986 | Wolter | |
| 4,620,088 A | | 10/1986 | Flies | |
| 4,659,915 A | | 4/1987 | Flies | |
| 4,663,952 A | | 5/1987 | Gelhard | |
| 4,686,358 A | | 8/1987 | Seckinger et al. | |
| 4,712,398 A | | 12/1987 | Clarkson et al. | |
| 4,723,427 A | | 2/1988 | Oliver | |
| 4,727,368 A | * | 2/1988 | Larson et al. | 340/825.31 |
| 4,732,022 A | | 3/1988 | Oliver | |
| 4,789,859 A | | 12/1988 | Clarkson et al. | |
| 4,823,575 A | | 4/1989 | Florian et al. | |
| 4,845,484 A | * | 7/1989 | Ellsberg | 340/825.35 |
| 5,140,317 A | | 8/1992 | Hyatt, Jr. et al. | |
| 5,245,329 A | | 9/1993 | Gokcebay | |
| 5,259,491 A | * | 11/1993 | Ward, II | 194/350 |
| 5,367,295 A | | 11/1994 | Gokcebay et al. | |
| 5,552,777 A | | 9/1996 | Gokcebay et al. | |

* cited by examiner

*Primary Examiner*—Edwin C. Holloway, III
(74) *Attorney, Agent, or Firm*—Thomas M. Freiburger

(57) ABSTRACT

A mechanical lock and key includes an electronic access control feature for preventing opening of the lock unless prescribed conditions are met. The lock cylinder, preferably the cylinder plug, is fitted with a small ID or "serial number" chip which is read when a voltage is applied. A connected addressable switch is connected to a solenoid capable of withdrawing a blocking pin, when the switch is activated. The mechanical key has a key head with a battery, microprocessor and database. When the key is inserted into the lock, a one-wire bus connection sends the lock ID to the key's microprocessor, a comparison is made by the microprocessor to determine whether the lock is authorized to be opened, and if so; a code for the addressable switch, determined from the key database, is sent via the one wire bus to the switch, powering the solenoid, withdrawing the blocking pin and enabling opening of the lock. A record is made in the database as to each instance of opening of each lock which the key fits. In electric parking meters, for example, cash count data can be read by the key and recorded for auditing the route. Rewritable memory can be included in the lock to store the cash count data gathered by the key for subsequent audit or, in situations involving several keys and a simple lock, to store a series of previous entry events for audit.

15 Claims, 13 Drawing Sheets

COIN COLLECTION LOCK AND KEY

This application is a continuation-in-part of application Ser. No. 08/342,846, filed Nov. 21, 1994, now U.S. Pat. No. 5,552,777, which was a continuation-in-part of application Ser. No. 07/836,206, filed Feb. 14, 1992, now U.S. Pat. No. 5,367,295.

BACKGROUND OF THE INVENTION

This invention is in the field of security and access control, and the invention particularly concerns access to coin box locks and other situations wherein a single mechanical key fits a number of locks and wherein there is a need to control the instances of opening each lock and to maintain a record thereof.

In the past, a number of electronic security features have been added to mechanical locks which use mechanical types of cylinders. In addition, locking elements controlled by electronic means have been disclosed in combination with non-mechanical types of tumblers, such as in Clarkson et al. U.S. Pat. No. 4,712,398. Some of the existing electronic systems have employed keypads, some have employed cards, some have had purely electronic, magnetic or optical access control devices, and some have employed mechanical keys equipped with electronic circuitry.

With respect to the present invention, distinction is made among purely electronic, magnetic or optical keys; mechanical keys equipped with electronic, magnetic or optical features; and mechanical keys which operate solely by mechanical bittings, whether those bittings be pin tumbler, dimples or other mechanical patterns.

A key comprised of purely electronic circuitry, magnetic or optical data storage for determining and granting access is an electronic key. In the use of such a key, the circuitry or recorded data is transferred to a reader associated with a lock, and the reader recognizes a pattern or code held by the key. The key does not carry any mechanical cut or bitting configuration needed for granting access. Keys of this type can be found in U.S. Pat. Nos. 3,797,936 (Dimitriadis), 4,209,782 (Donath et al.), 4,257,030 (Bruhin et al.), 4,620, 088 (Flies), 4,659,915 (Flies) and 4,789,859 (Clarkson et al.).

Keys referred to as mechanical keys are those which activate a mechanical device, with a pattern of mechanical bittings, by direct contact with the interpreting device, i.e. the tumblers or other pattern-holding apparatus contained in the lock. In a typical pin tumbler lock, access is granted based on the depth and configuration of key cuts meeting the tumblers. In most cases, once proper alignment is established in the tumblers, the keyholder is able to turn the key to lock and unlock the locking device. However, in some cases of mechanical keys, a push or pull action may be necessary for locking and unlocking of the device. The tumblers mentioned above can be pin tumblers, lever tumblers, disk.tumblers, rotary disk tumblers, slider tumblers, or combinations of several of these incorporated within the same lock. Examples of purely mechanical keys are found in U.S. Pat. Nos. 480,299 (Voight), 550,111 (Sargent), 564,029 (Sargent), 3,208,248 (Tornoe), 4,723,427 (Oliver), 4,732,022 (Oliver) and 4,823,575 (Florian et al.).

Examples of mechanical keys equipped with electronic circuitry, magnetic or optical data storage or optical recognizable features can be found in U.S. Pat. Nos. 3,733,862 (Killmeyer), 4,144,523 (Kaplit), 4,326,124 (Faude), 4,562, 712 (Wolter), 4,663,952 (Gelhard), 4,686,358 (Seckinger et al.), 5,245,329 (Gokcebay) and 5,140,317 (Hyatt, Jr. et al.). Such keys carry the secondary element, whether it comprises electronic circuitry or some other type of coded data or recognizable pattern, in addition to the key's mechanically operating pattern or bitting. In some instances both mechanical and non-mechanical features of a key are used simultaneously.

U.S. Pat. No. 5,140,317, referenced above, discloses a combined mechanical lock/key combination which further includes an electronic feature for permitting opening of each lock in a system of similarly-keyed locks, only when authorized, and with a recording of each lock opening made. The system disclosed in the patent includes a mechanical key with a key cut configuration, and with means for making electrical contact with electronics inside the lock. A separate box is connected by electric wiring to the key, the box including a keypad, a microprocessor, a battery for powering the system and a memory with stored data. The lock includes a retractable blocking means which blocks opening of the lock's bolt, separately from the mechanical bitting, except when prescribed conditions are met. When a solenoid in the lock is activated the blocking means is retracted. The lock also includes its own microprocessor, which controls switching of power to the solenoid, and with a memory within the lock storing data. The microprocessor within the lock compares coded data read from the key with coded data in the memory within the lock, and thus controls powering of the solenoid to situations in which a comparison, made within the lock's microprocessor, determines that coded data read from the key matches coded data in the lock's memory. Also, the lock's microprocessor further calculates a new code for the lock, after each opening of the lock.

The above patent is applicable to coin locks and other situations wherein a mehanic al key has bit ting matched to a large number of similar locksi but where control of the opening of each lock is desired, and where a record is needed of each lock's opening. The system has been applied to pay telephone coin boxes. However, besides requiring the inclusion of a microprocessor and associated memory within the lock itself, the system of the patent requires additional hardware within the lock casing or the coin box for blocking the op ening of the lock except when the microprocessor determines it is proper. The disclosed system thus is a pplicable only to locks wherein considerable space is available for these added elements, and would be difficult or impossible to implement-in situations with little space available. In addition, considerable modification in retrofitting of existing locks is required, increasing cost of implementing the system, in addition to high cost of manufacture and materials.

In the case of coin collection from parking meters, counters have been included in certain electronic parking meters to count the total money which has been inserted into the meter. These electronic meters have a built in interface to communicate the data via infrared transmission to a portable data collection unit under the control of an auditor. Each time a coin collection operator collects coins from the parking meters, the counter in each meter automatically resets to zero. The auditing function is separate; auditors are supposed to use the separate data collection units to audit the total of money being collected from each meter, along with several other statistics. However, in such a system there is no way to pinpoint a skimming of coins or to identify the responsible personnel when coins have been skimmed. The meter-by-meter audit is conducted at a different time from the collection of coins.

It is an object of the invention described below to provide a system which is very easily retrofitted into lock systems having a single key operating a number of locks, and which avoids the need for electronics, solenoids or other hardware which would take up space within the coin box or the lock casing adjacent to the lock. In additional aspects of the invention, it is an object to provide a convenient means for electronically transferring a total of coins collected from each coin lock box. (such as in parking meters) to a storage device carried by the operator, preferably within the key unit, to prevent collection of the coins until such data has been transferred, and, in another embodiment, to record each instance of access to a lock, by key number, in the situation of a lock accessible by a number of different keys.

SUMMARY OF THE INVENTION

In accordance with the present invention, a key and lock combination achieves the objectives of security in a coin lock type system wherein a single mechanical key is fitted to a plurality of similarly keyed mechanical lock cylinders. The system of the invention includes a key which is self-contained, with a key head having a microprocessor, memory and battery, as well as a contact point for a one wire bus connection with the lock. In certain embodiments the lock is fitted with a special EEPROM which records each instance of the lock's being accessed, e.g. by time, date and key number, for the situation where a single lock can be accessed by a number of keys.

The lock, which may be a coin collection lock for telephones, parking meters, slot machines or other similar applications, has an electronic access feature which occupies no more space than the mechanical lock itself. Nothing is required outside the lock cylinder, and in fact, in preferred embodiments, all electronics and hardware are contained in the cylinder plug, aside from a small recess or bore which is provided in the cylinder shell.

In a specific embodiment the cylinder plug, in a typical rotatable plug type lock cylinder, contains a one-wire bus connection for contact with the key, a blocking pin which prevents rotation of the plug independently of the mechanical bittings (shear plane tumblers), and an addressable switch for supplying power to the solenoid to release the blocking pin only upon specified conditions being met. A decision as to whether the addressable switch should conduct power to the solenoid is made inside the key, not the lock. Within the key's database is a list of locks, by serial number or code, which are within the system and are normally openable by the mechanical key. Since the locks in a route collection system may only be permitted to be accessed at certain times (the microprocessor preferably includes a clock/calendar) and not more than once by a keyholder on a route, the microprocessor can grant or deny access on these bases. Further, within the database in a preferred embodiment is a list or table associating a secure addressing code for the particular addressable switch with each serial number or coded ID number of a lock. When a lock is "read" by the key, the key's microprocessor determines whether it is appropriate for the lock to be opened at that time, and if so, it sends the approval code back into the lock to effect switching of the addressable switch. This conducts power to the solenoid, releasing the blocking pin.

The one wire bus connection in the cylinder plug may be generally as disclosed in the above-referenced U.S. Pat. No. 5,367,295, and may have a spring-biased, isolated contact which extends forward from a bore in the cylinder plug; alternatively, the isolated contact may be flush with the plug or recessed, so long as the key's contract reaches the lock's contact. The metal of the cylinder plug of course forms a ground connection.

In a preferred embodiment the electronics included on the cylinder plug comprise a "Silicon Serial Number" as manufactured by Dallas Semiconductor, as an ID for the lock. Such an electronic ID device has a coded serial number which is readable by application of a voltage. The Silicon Serial Number may be a laser-etched 64-bit ROM with a 48-bit serial number, powered by the data line with no need for an additional power source. The ID chip requires no standby power to maintain the memory of the serial number. The device is quite small, only about 3.7 mm by 4 mm by 1.5 mm, ideally suited for purposes of the present invention. A second electronic device, connected to the ID device, is the addressable switch. This electronic component, also manufactured by Dallas Semiconductor, is approximately the same size as the ID device. The addressable switch has its own code, and will switch the circuit to conduct power to the solenoid only when it is addressed with the proper code. This particular addressable switch is of a type that resets with a second application of the switch code, which is automatically issued by the microprocessor after a prescribed time delay to allow opening of the lock, e.g. one to three seconds. Means are provided in the circuit, preferably between the addressable switch and the ID device, for preventing reading of the code of the addressable switch from outside the lock. Thus, the key first reads the ID code, identifying the lock which is to be opened, and if opening is authorized, the key sends back the code for the addressable switch, upon which the addressable switch switches the circuit to conduct power from the key through to the solenoid to release the blocking pin. In a preferred embodiment, the opening of each lock is recorded by the microprocessor, in the data storage of the key. Each lock ID in the-database is marked as having been opened when that event has occurred, and preferably the time and date are-also marked.

The head of the key includes a data port for unloading data from the microprocessor and database, as to locks that were opened on the operator's route and any other pertinent information regarding attempted lock openings, wrong PIN numbers, etc. Also, the key head preferably includes a recharging port for enabling the recharging of a battery within the key head.

Another feature of the invention is a small keypad on the head of the key. This can be used for additional security, to require an operator to input an authenticating code known only to the proper operator. Thus, the key cannot be used by an unauthorized person. The programming of the microprocessor preferably is set so that the operator enters his PIN number at the start of a route wherein a series of locks will be opened. The system can require an updated reentry of the PIN number at various intervals, if desired. Further, if the lock ID read by the key from a lock does not exist in the key's database, the key, which includes a small display, can request the operator to reenter his PIN number. Further use of the key can be denied the operator if the newly entered PIN number is not the correct number, or if several locks not existing in the key's database (or not authorized to be opened at the particular time) are attempted.

In one preferred embodiment, the key has a key blade, containing the mechanical bittings, which is removable from the key head. This enables the electronics of a key, or the mechanical bitting of a key, to be changed without producing an entirely new key. Locks may be changed in the manner of typical mechanical locks, by replacing the cylinder, or refitting the mechanical bitting (new sets of tumblers), and changing the cylinder plug.

In another aspect of the invention, locks associated with coin collection routes are provided with counter devices for counting the amount of money stored in the coin box, with provision for electronically interfacing with a portable data collection unit for recording the total money which will be removed from the coin box. This is particularly useful in coin collection situations such as parking meters, which prior to this invention have already been provided with such electronic counters and interfacing units utilizing infrared data transmission. With the invention described herein the system does not allow a parking meter (or other coin box) to be accessed by the collection operator until the data showing the total money in the box have been transferred to the portable data collection unit. Also in accordance with this invention, the portable data collection unit preferably is integral with the key device used by the coin collection operator. This not only provides for a single device to be used by the operator for data collection and for actual opening of the coin box; it also enables the intelligent key, with a microprocessor and memory as described above, to prevent the opening of the coin box until such data have been collected. In this way the operator cannot remove coins without providing an automatic audit of the amount of money to be removed from each parking meter or other coin box.

An additional feature in a preferred embodiment of the invention provides for the ability to record audit trail data from the coin collection route. This feature enables management to recreate collection data in the case of loss (or alleged loss) of a key. In the event the coin collector claims he has lost the key at the end of the day, and that the money he delivers is the total of what has been collected that day (while retaining some of the money for the collector's drug habit, for example), management can return to the parking meters (or other devices) on the collector's route and recreate the coin collection data by going through the same route, meter by meter. For this purpose the parking meter is provided with a memory which retains the data representing total stored money after the coin collection operator has transferred the data to the key device. One preferred way of implementing this storage is to transfer the total stored money data from the key's memory into a special EEPROM in the lock since the coin counter is separate and independent and not connected to the lock electronics. This can be done by first reading the money data using the key device, which transfers the data into the key, while the counter may then automatically reset to zero; then, when the user inserts the key into the lock, automatically transferring the stored money data into the lock itself, to be retained on the EEPROM of the lock until such time as (1) the route collector returns again to collect more coins; or (2) an auditor goes out to check each parking meter by inserting a specially programmed key device into each meter, for the sole purpose of transferring the electronically stored total money data into the key device. In either event, the stored data in the special EEPROM can be deleted.

In another aspect of the invention, the lock and key apparatus are used in a situation where a single lock securing stored money is accessible by a plurality of keys held by different personnel. A prime example is a slot machine. In an embodiment of the invention directed at this purpose, the lock has the ability to record entry data sent by the key device, that is, time and date of each entry and by key number. This feature will enable downloading of an audit trail revealing which personnel have opened the particular lock and at which times. If coin counting is a part of the particular device, the information as to total money stored or received as of the time of each lock accessing can also be retained for the audit. As in the embodiments described above, the special rewritable EEPROM for this purpose may be compactly contained on the cylinder plug of the locks, without requiring space-consuming retrofitted apparatus.

It is thus seen that the mechanical/electronic lock and key of the invention provides, in an extremely compact fashion, electronic access control to a conventional mechanical lock. No additional space in a lock is required to implement the system of the invention. The system is particularly useful where a single key is matched to a number of locks, and a key of the invention has onboard microprocessor, database and battery so that all comparison and decision making as to access is performed in the key itself, without requiring any microprocessor or data storage within the lock. Only a "slave" unit is included in the cylinder, responding to what the "master" (the key) sends. There are not intelligence capabilities in the lock itself. The system can provide audit capability for coin collection routes; other embodiments provide audit capability where a single lock (as in a slot machine can be accessed by multiple keys. These and other objects, advantages and features of the invention will be apparent from the following description of a preferred embodiment, considered along with the accompanying drawings.

DESCRIPTION OF THE DRAWINGS

FIG. 4 shows a blocking pin associated with the electronic access control features, the pin being retracted.

FIG. 6 also shows an additional component 51 which comprises an EEPROM, which can be used for a data storage/transfer purpose described below.

DESCRIPTION OF PREFERRED EMBODIMENTS

Figure 1:
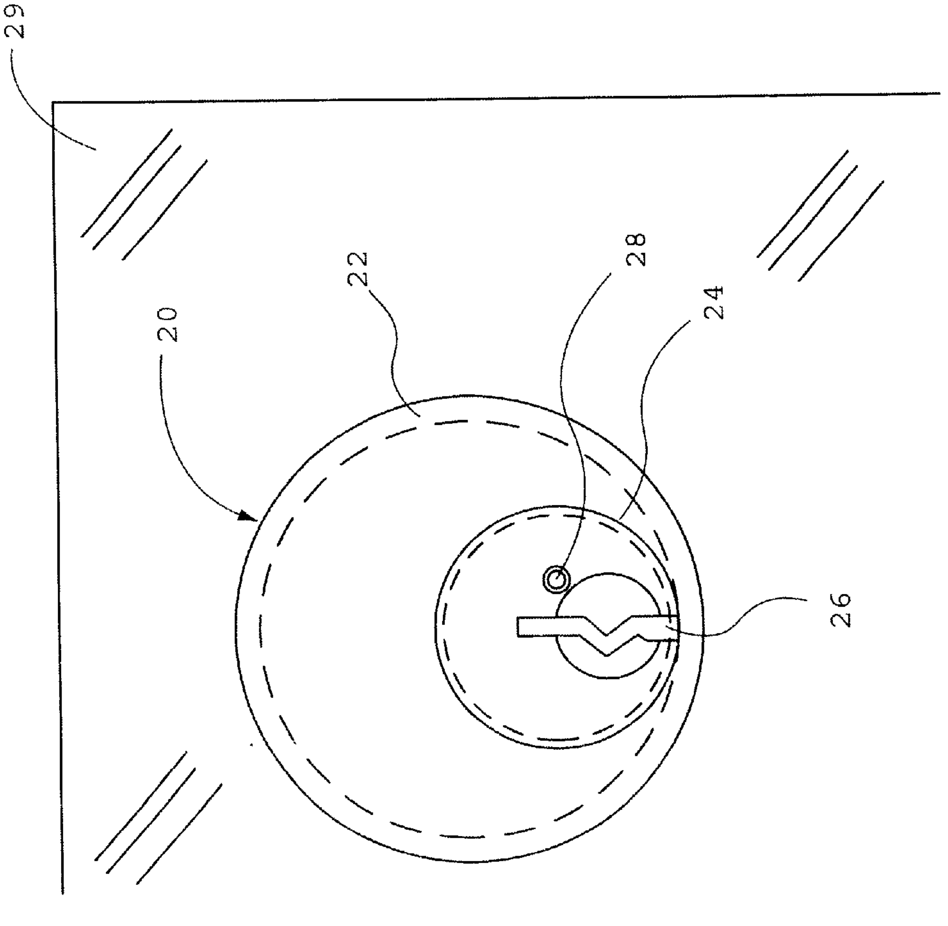
FIG. 1 is a front elevation view showing a conventional mechanical lock cylinder of the pin tumbler type, as an example of an application of the invention, fitted with a one wire bus contact as part of the system of the invention.

FIG. 1 shows a conventional lock cylinder 20 which may be of the pin tumbler type, with a face plate 22 and a cylinder plug 24 which includes a keyway or key slot 26 and an electrical contact 28 which is isolated from the metal of the plug 24. The contact 28 may be formed in accordance with copending Ser. No. 836,206 (U.S. Pat. No. 5,367,295), where the contact is disclosed as being spring-biased for engagement with a contact on a key; it can take other forms, so long as it is positioned to be engaged by a mating contact from the key. The cylinder 20 is mounted in an area to be secured 29, or a lock casing.

Figure 2:
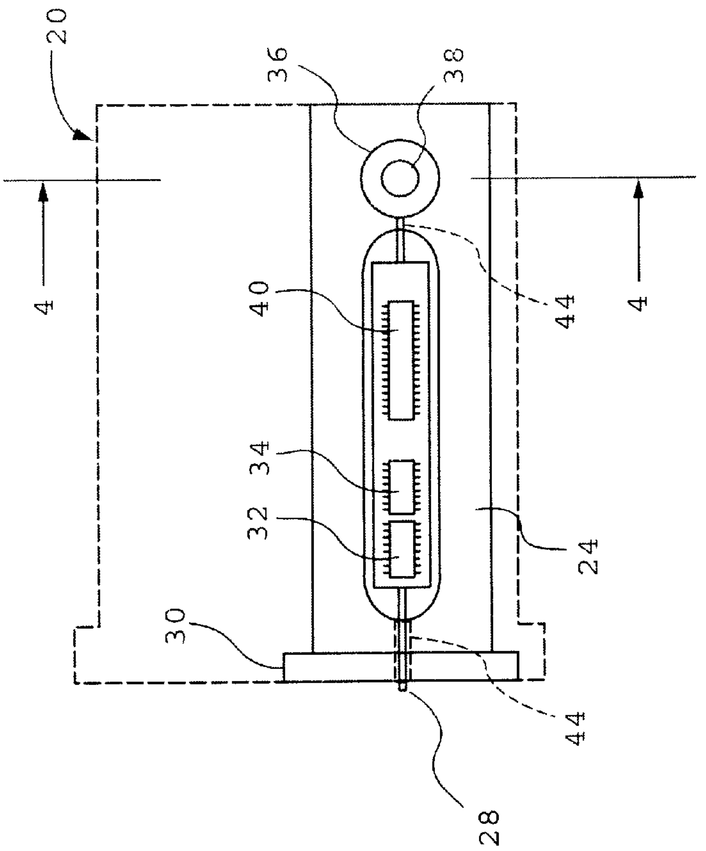
FIG. 2 is a schematic side view showing a cylinder plug of the lock cylinder of FIG. 1, showing access control components of the invention and indicating in dashed lines the cylinder shell surrounding the cylinder plug.

FIG. 2 shows the lock cylinder 20 in dashed lines and shows the cylinder plug 24 in side elevation. FIG. 2 shows that the cylinder plug 24 has a head 30 of somewhat greater diameter, as is conventional. The contact 28, which establishes a one wire bus protocol for electrical connection to the key, with the metal of the plug serving as ground, is connected to a printed circuit board with components 32 and 34 and, when so switched, to a solenoid 36 which is effective to retract a blocking pin 38 when energized. Further electrical components are shown in the circuit at 40 and are discussed below with reference to FIG. 9.

As can be seen from FIGS. 2, 3, 4, 5 and 6, the components 32, 34 and 40 preferably are positioned in a flat or recess 42 in the surface of the cylinder plug 24. These drawings show the conductive path 44 from the external contact 28 through the components 32, 34 and 40 to the solenoid 36, in dashed lines. The conductive path includes the component 34, which comprises an addressable switch as noted above. This component may be the addressable switch identified as Model No. DS2405 by Dallas Semiconductor. This addressable switch is quite small and requires no standby power, and comprises an open drain N-channel transistor that can be turned on or off by matching the 64-bit factory-lasered registration number within the component. Each addressable switch, for each different lock in the system, has a unique 48-bit serial number, as well as an 8-bit cyclic redundancy check and an 8-bit family code. It is operated with a one-wire protocol, so that power can be put through the switch using the same line used to convey data. The addressable switch, preferably the DS2405 noted, is a slave device to be operated by a bus master. The switch 34 is controllable by addressing, between a state wherein it is switched "on" to the components 40 and ultimately to the-solenoid 36, or an "off" state wherein the connection to the components 40 and 36 is not made. The identified addressable switch, the DS2405, is switched "on" by a first address, comprising transmitting of the 64-bit registration number as data to the switch, and it is switched "off" by a second application of the same data.

The electronic ID device 32 may comprise a Dallas Semiconductor Part No. DS2401 Silicon Serial Number. Its dimensions are the same as those of the addressable switch 34, noted above. Again, zero standby power is required to this component, thus eliminating the need of any standby or continuous power in the cylinder plug. It operates in an approximately 2.8 to 6.0 voltage range, and it will transfer data through a single data lead (with ground return), the same lead that is used to supply power to the solenoid 36. The ID device 32, i.e. the DS2401, has an internal ROM accessed via the single wire data line. Like the addressable switch 34, the component 32 has a 64-bit registration number, including an 8-bit family code, a 48-bit unique serial number and an 8-bit CRC tester, and no two DS2401 components are alike. Also like the addressable switch 34, the ID device 32 is a slave device, with the bus master being a microcontroller. Its function is to allow the reading of its unique serial number.

Figure 3:
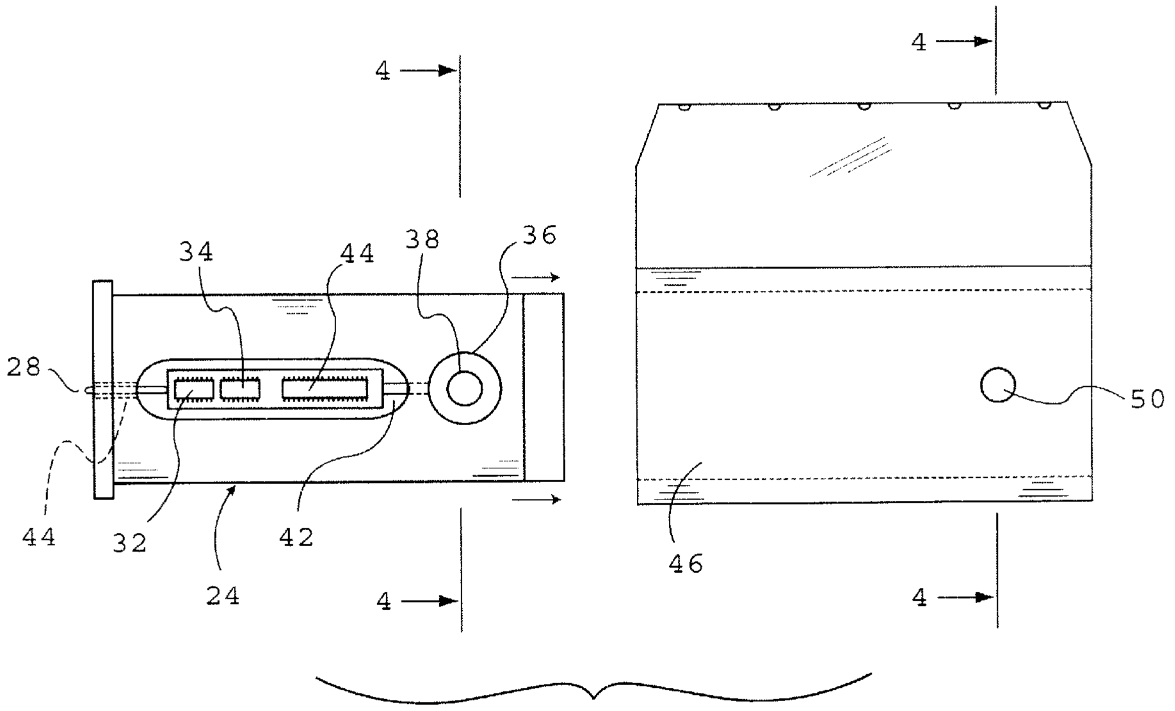
FIG. 3 is a side elevation view similar to FIG. 2, but exploded inform and showing a cylinder plug as removed from a cylinder shell, in a knob lock type of cylinder.
Figure 4:
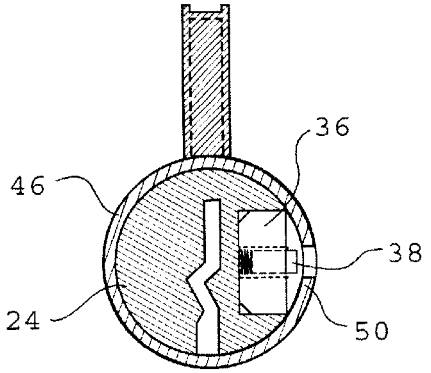
FIG. 4 is a sectional elevation view taken through the cylinder plug and cylinder shell, as seen generally along the line 4—4 in FIG. 2.
Figure 5:
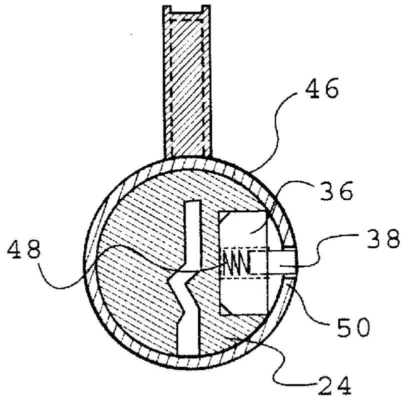
FIG. 5 is a view similar to FIG. 4, as viewed generally along the same line in FIG. 2, but showing the blocking pin extended and blocking rotation of the cylinder plug.

As seen in the cross-sectional views of FIGS. 4 and 5, the cylinder plug 24 is rotatable within the cylinder shell 46 only when the blocking pin 38 has been retracted by the solenoid 36. The pin 38 is biased outwardly by a compression spring 48, to the position shown in FIG. 5 which prohibits rotation of the plug 24. The small solenoid 36 when powered overcomes the force of the compression spring 48. FIGS. 4 and 5, and also FIG. 3, show a bore or recess 50 into which the blocking pin 38 extends in the blocking position. This bore, recess or groove 50 is the only modification required in the entire lock, other than those on the cylinder plug 24 itself. The bore or recess 50 is easily formed by drilling a hole through the cylinder shell 46 or forming an internal recess or groove on the inside surface of the cylinder shell. Preferably the bore 50 passes through the shell, as shown in FIGS. 3–5.

The invention allows for secondary locking "high security" mechanical features, generally located in a side of the cylinder plug. These can be located on the opposite side of that shown in FIG. 3. Examples of such features are Schlage Primus and Medeco Biaxial.

Figure 6:
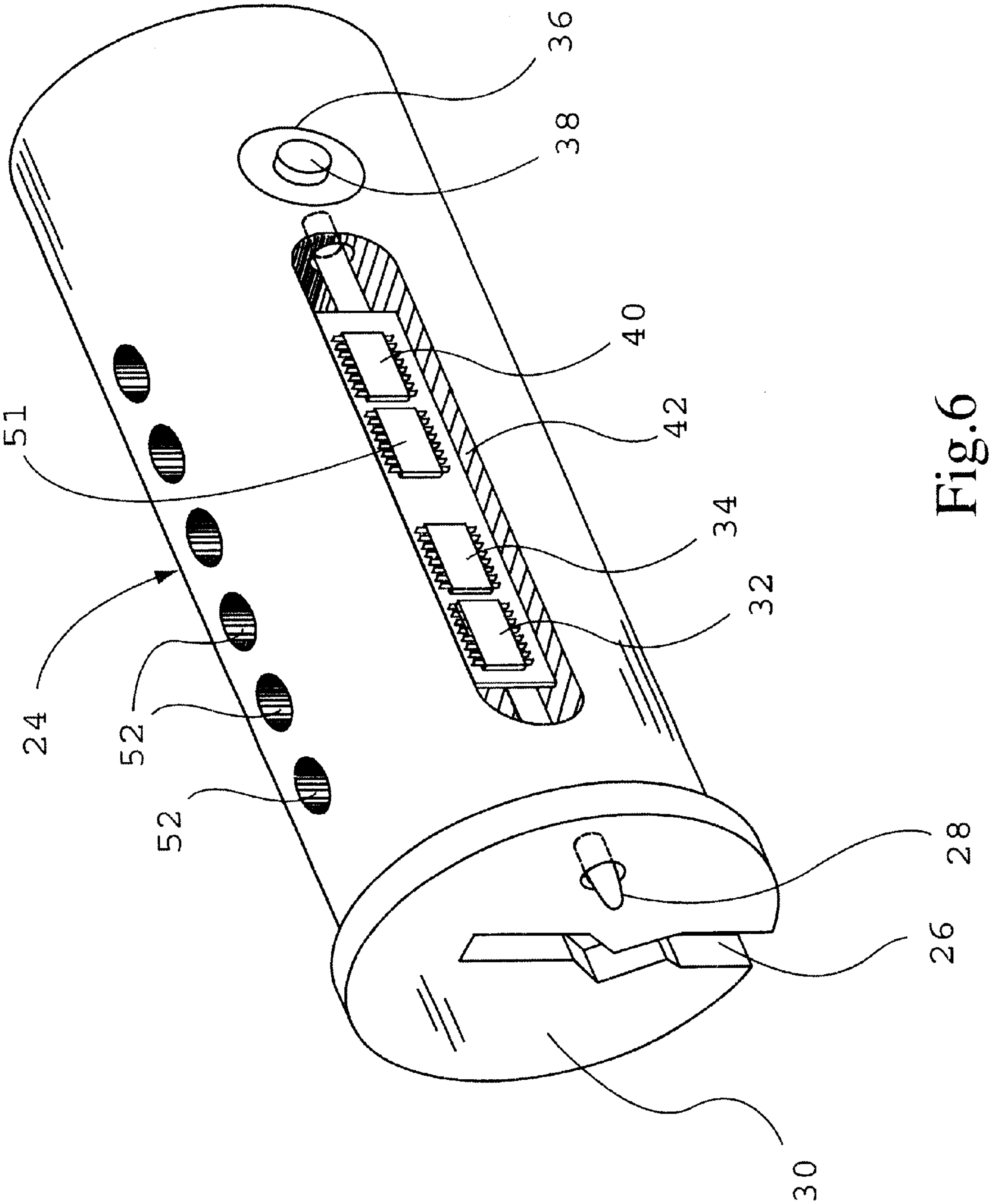
FIG. 6 is a perspective view showing the cylinder plug of FIGS. 2 through 5, and indicating the one wire bus contact, the electronic components and the solenoid-activated blocking pin, as well as a series of bores for conventional pin tumblers.

FIG. 6, showing the cylinder plug 24 without the shell 46, indicates tumbler bores 52 in the upper side of the plug, for the conventional pin tumbler mechanical bittings.

FIG. 6 also shows an additional component 51 which comprises an EEPROM, which can be used for a data storage/transfer purpose described below.

Figure 7:
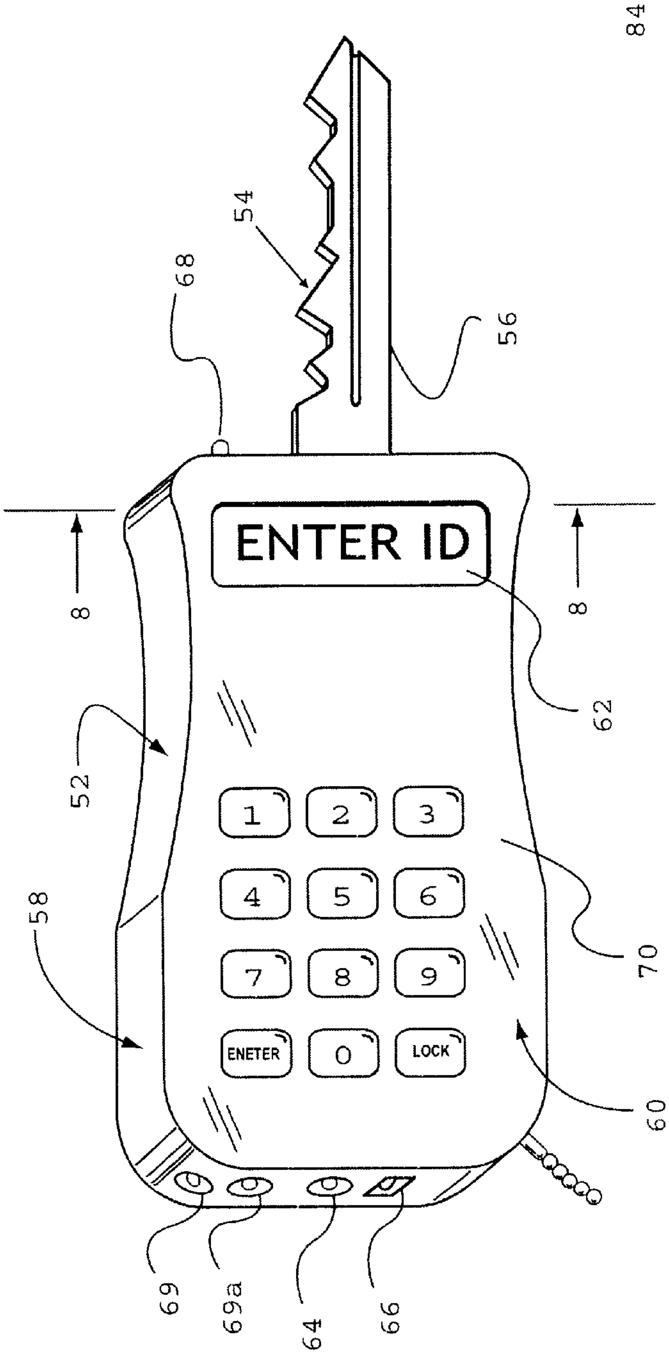
FIG. 7 is a perspective view, somewhat schematic, showing a mechanical key, forming a part of the system of the invention, the key including a mechanical key blade and a key head with keypad and electronics. Features are indicated for transferring coin collection audit data from a coin-operated device such as a parking meter to the key device.

FIG. 7 shows a mechanical key 52 which has a mechanical bitting pattern, i.e. a key cut 54 on a key blade 56, matched to the lock including the cylinder 20 and plug 24. The mechanical key bitting is matched in a preferred system to a large number of similar locks, such as locks to coin boxes for pay telephones, parking meters, vending machines or other secured areas where control is desired as to the timing and frequency of access to a secured area. The key 52 with its bitting 54 can be a master key which is matched to a number of secure locks, but which requires use by a properly authenticated keyholder and wherein access is to be granted only when prescribed conditions are met. The key 52 has an enlarged key head 58, sufficient to contain internal electronic components and to also have an external keypad 60 and, preferably, a small display 62. At a back end of the key head are a data port 64 and a battery recharge port 66. The front of the key head has a one wire bus contact 68, isolated from the metal of the key blade 56 and positioned to engage the contact 28 positioned at the front of the cylinder plug 24. The key head is encased in a plastic or elastomeric casing 70.

FIG. 7 also shows infrared data interfacing ports 69 and 69*a* contained on the key head 58. As explained below, these enable infrared data transfer to and from the key for certain applications.

Figure 9:
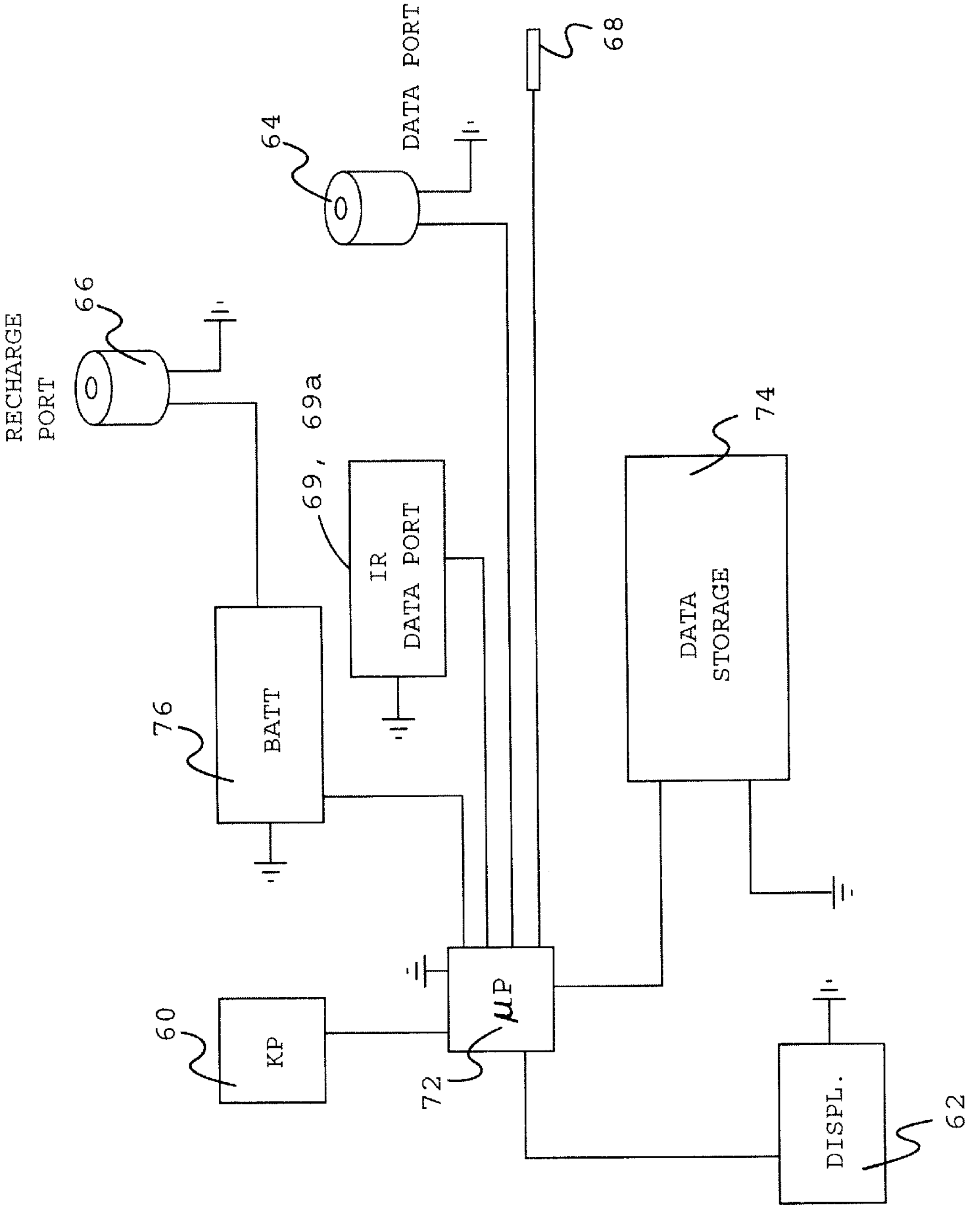
FIG. 9 is a schematic block diagram showing components of a mechanical/electronic key which forms a part of the invention.

FIG. 9 is a schematic block diagram showing components of the key head 58. The external single wire bus contact 68 is connected to a microprocessor 72 within the key head. The processor 72 is connected to the keypad 60, the display 62 (which may be an LCD or LED), a data storage device or database 74, a battery 76 and the data port 64 and battery recharge port 66. The microprocessor 72 may comprise, for example, an MC684CII, including EEPROM and RAM data storage (74) manufactured by Motorola. The keyboard 60 may be about ½ inch by ¾ inch in overall size, so that it is best operated using a pencil, pen or stylus. The display 62 may be approximately ⅝ inch in length. The overall size of the key head 58 may be about two inches in length, one inch in width and about ¼ to 5/16 inch in thickness.

FIG. 9 also shows schematically the infrared data port or ports indicated as 69, 69*a*. The block 69, 69*a* includes all associated electronics for transferring the IR-carried data into the microprocessor 72 and for generating IR signals confirming data transfer, as explained below.

Figure 8:
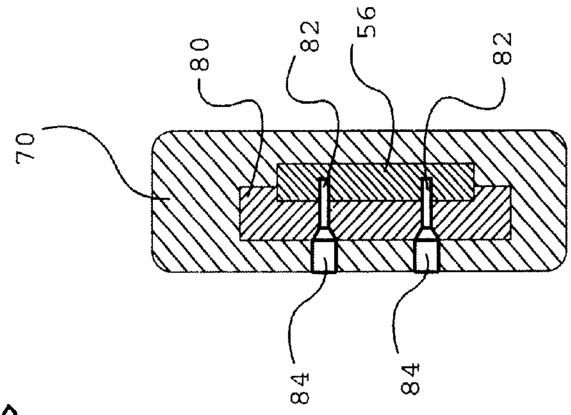
FIG. 8 is a sectional view through the key of FIG. 7, as seen generally along the line 8—8 in FIG. 7, showing a means for interchanging of the key blade.

FIG. 8 shows in cross section one arrangement by which the key blade 56 may be interchangeable for a different key blade. As shown, the key blade 56 may be secured into a closely fitted groove or recess of a metal head portion 80 of the key, which extends partway into the key head 58 and which is tightly secured into the plastic casing 70. Small machine screws 82 are used to secure the key blade 56 into the metal head portion 80, which has threaded bores. As indicated, openings 84 may be provided through the plastic casing for access to the heads of the machine screws 82. Thus, if a system of locks and the key 52 are to be fitted with new mechanical bittings, the entire key 52, with the internal electronics, display and keypad, need not be replaced. A different blade 56 may be interchanged; with corresponding bitting changes to the cylinder plug 24 and shell 46, and in the field a simple replacement may be made of the plug and shell combination in each lock of the system (with rekeying of removed plugs/shells done elsewhere).

Figure 10:
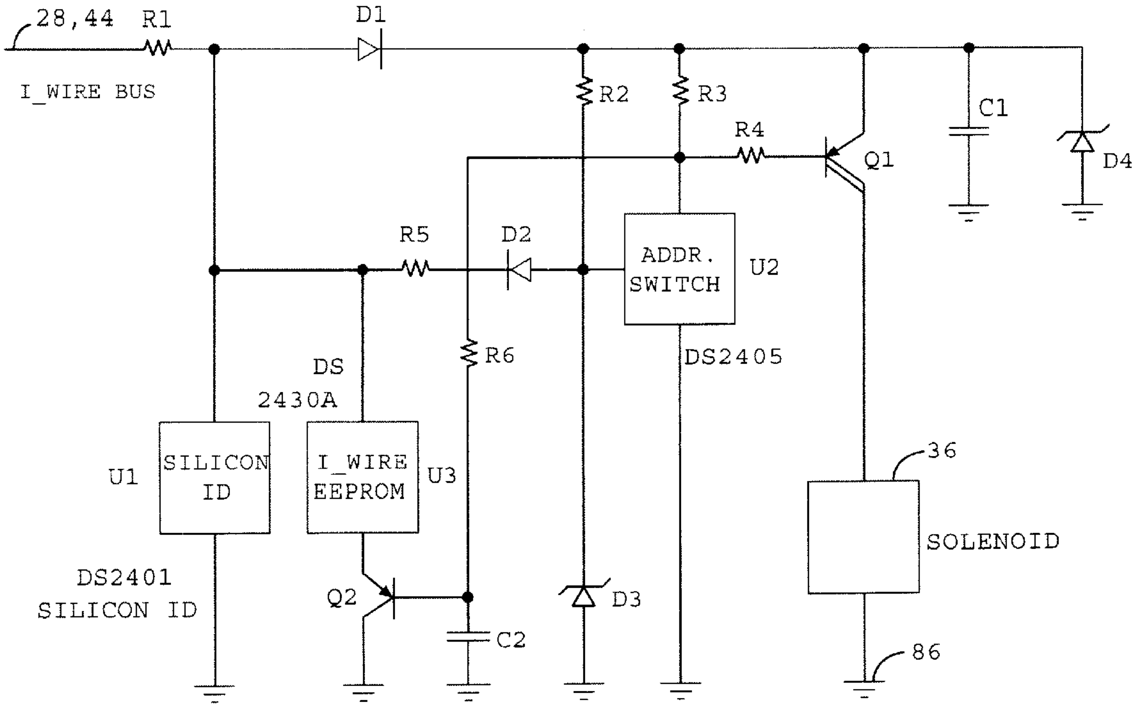
FIG. 10 is a schematic circuit diagram indicating components on the cylinder plug, for controlling the blocking pin.

FIG. 10 is a schematic circuit diagram for the components in the cylinder plug. As indicated, the one wire bus comes in at 28, 44, with ground at 86. The ID device 32 is shown at U in the circuit diagram, identified as DS2401 for the preferred embodiment described. This comprises a low cost electronic registration number device as noted above, providing a completely unique identity as a slave device, which can be read by the master (the key assembly). The addressable switch 34 is shown at $U_2$ in the diagram, DS2405 in this embodiment, an open drain Nchannel transistor that is turned on or off by matching the 64-bit factory-lasered registration number with data sent from the key. This registration number is indexed in the data storage 74 of the key, in combination with the number of $U_1$, the ID device. The $U_1$ ID can be read by the master, but the number of the $U_2$ switch cannot be read, because of the diode shown at $D_2$.

FIG. 10 also shows a memory device $U_3$, connected into the one-wire bus circuit, for an embodiment described below in which the lock stores certain data.

The master, i.e. the electronics of the key including the microprocessor 72, sends serial data to the one wire bus 28 and thus reads the unique number within the ID device $U_1$. Using this number the microprocessor looks up in its database 74 an associated number, which is the unique number of $U_2$, the addressable switch. As explained herein, this can be coupled with another query, such as whether the lock is authorized to be opened based on date and time or previous opening of the lock which may have occurred. The data matching the $U_2$ number to the $U_1$ number, as well as any data regarding authorized dates and times, operator's PIN number, etc., have been loaded into the data storage of the key via the data port 64, by management prior to the operator's beginning his route. After looking up this address number or code from the database, assuming opening is authorized, the microprocessor sends the number on the one wire bus to $U_2$, to turn on the addressable switch. When $U_2$ is properly addressed, Darlington transistor $Q_1$, is turned "on", causing power to be supplied to the solenoid 36. Component 40 in FIGS. 2, 3 and 6 represents all electrical plug components except for $U_1$ and $U_2$ (although not all such components will be positions in the order shown). The term "addressable switch means" in the claims in intended, as applied to this described embodiment, to include the components $U_1$ and $Q_1$. When the solenoid is powered the blocking pin 38 (FIGS. 3–6) will be released, i.e retracted, and the operator will be able to rotate the key in the lock, since the key bittings 54 will match the bittings of the lock cylinder. The operator is thus able to gain access to the locked area, such as a coin box. The master, i.e. the microprocessor 72, sends the unique number again to $U_2$ to turn off $U_2$ and $Q_1$, stopping the current to the solenoid and allowing the compression spring to push the blocking pin outwardly when the cylinder plug is returned to the locked position. During this transaction, a record is made in the database 74 by the microprocessor 72, indicating that the particular lock, by serial-number, has been accessed. The record can include the date and time, since the microprocessor will include a clock.

The required power is supplied by the master through the diode $D_1$. The capacitor $C_1$ is used to maintain the supply of voltage during low times of the one wire bus.

$R_1$, $D_3$ and $D_4$ are used for reverse polarity and high voltage protection.

Figure 10A:
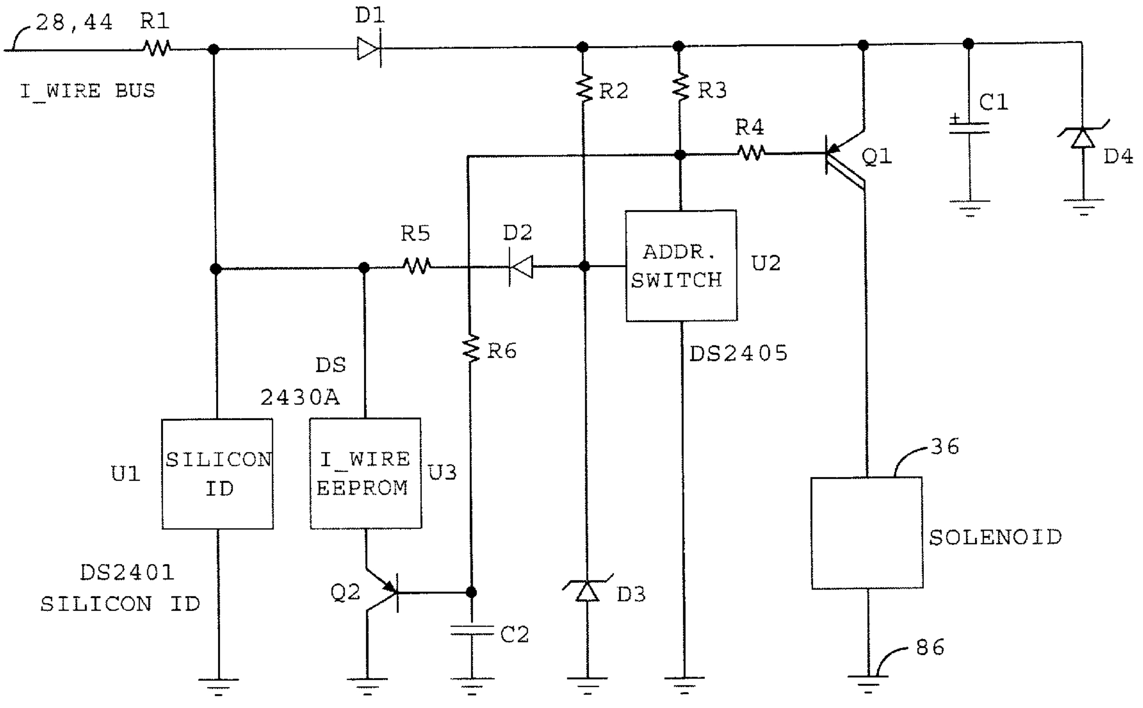
FIG. 10A is a diagram similar to FIG. 10, but with a modification.

FIG. 10A shows a modified circuit in which the $U_1$ ID device (DS2401 in FIG. 10) is replaced with a rewritable memory device, DS2430A. The DS2430A can be rewritten to change the ID number for security purposes, such as in the case where the key of FIGS. 7 and 9 is lost or stolen.

Figure 11:
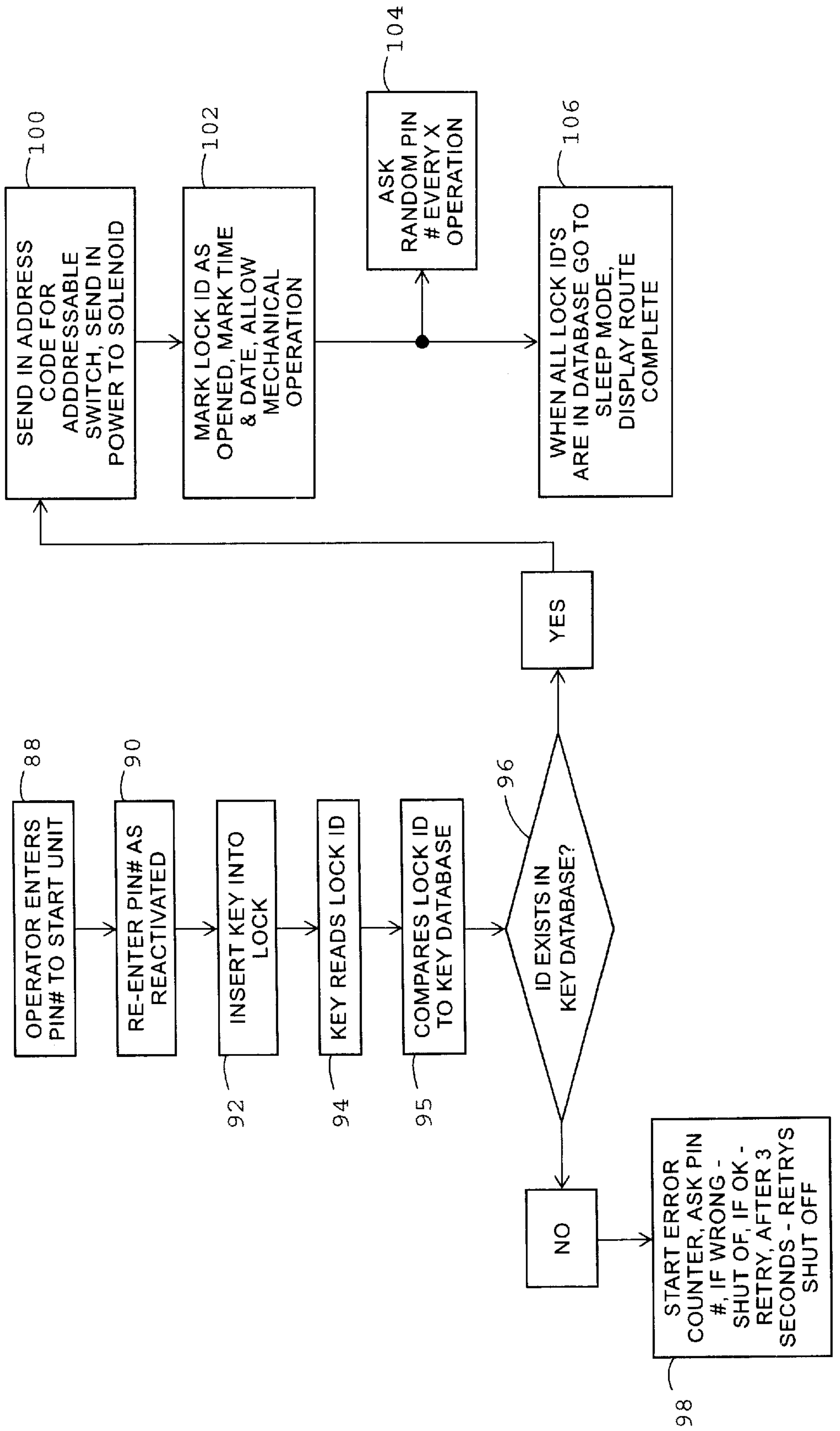
FIG. 11 is a flow chart indicating steps in use of the mechanical/electronic key and lock of the invention.

FIG. 11 shows in flow chart form the procedure for use of the key 52 and indicates internal processing which results in the decision whether to grant access. As can be seen in the first block 88 of FIG. 11, the operator first enters his personal identification number (PIN) to start or activate the key unit. The microprocessor is programmed to deny access to all locks unless an authorized PIN number is entered, as determined in the database or data storage 74 (FIG. 9). The next block 90 in FIG. 11 indicates that the operator must reenter his PIN number after a prescribed period of time has passed, particularly if the key has not been used, in order to reactivate the system within the key.

On the route using the key 52, such as a coin collection route involving pay telephones, parking meters or the like, the operator inserts the key into a lock on the route, as indicated in the block 92 of the diagram. The key device reads the lock ID (block 94), using the microprocessor 72 and a voltage applied through the one wire bus connection into the data line, power being supplied by the onboard battery 76. The serial number of the ID device 32 is read when the voltage is applied. As noted in the block 95, the microprocessor in the key compares the read lock ID to the onboard database, to determine whether that lock ID exists in the key database (decision block 96). If the ID read from the lock does not exist in the database, the block 98 indicates that an error counter is started. The key's display 62 will indicate to the operator to again enter his PIN number (as noted by the displayed message in FIG. 7). If the PIN number is not authorized, the system is shut down. If it is authorized, the operator may retry a preselected number of times, such as three times as indicated in the diagram.

Implicit in the box 96 is a further function of the microprocessor as released to the database. As noted above, the microprocessor in a preferred embodiment will determine whether this particular lock is authorized to be opened. This decision may be made based on whether the lock has already been opened once before, since the last downloading of data from the key, which might indicate that the operator is attempting to make an unauthorized further collection of coins on his own behalf. The system, if desired, could also discriminate on the basis of date and time when the operator is supposed to be opening this lock; on the basis of the identity of the operator in accordance with the PIN number entered; or on other bases.

If these other conditions are met, the microprocessor sends the addressable switch code associated in the database with this particular lock ID, into the data line or one wire bus connection. This is indicated in the block 100 in FIG. 11. When this address code is sent to the addressable switch (34 in FIGS. 2–6), this activates the addressable switch to switch "on", sending the power existing in the line to the solenoid 36. The lock may then be opened.

The block 102 in FIG. 11 shows that the microprocessor marks the particular lock ID as having been opened, in the database. Also recorded in a preferred embodiment is the time and date.

The block 104 in the diagram indicates that the display 62 (FIG. 7) prompts the operator to enter his PIN number again at a selected frequency, such as after each instance of a given number of locks being opened, or at random times. This provides additional security against an unauthorized person using the key, such as by theft from the authorized operator. Also, for added security, the key preferably has an internal tamper switch which prevents key function entirely, when the key cover is opened, requiring reset by specific codes.

The block 106 indicates that when all lock IDs for the group of locks in question have been marked in the database as having been opened, the system preferably goes into a "sleep" mode, minimizing power requirements, and shows on the display 62 that the route has been completed.

Figure 12:
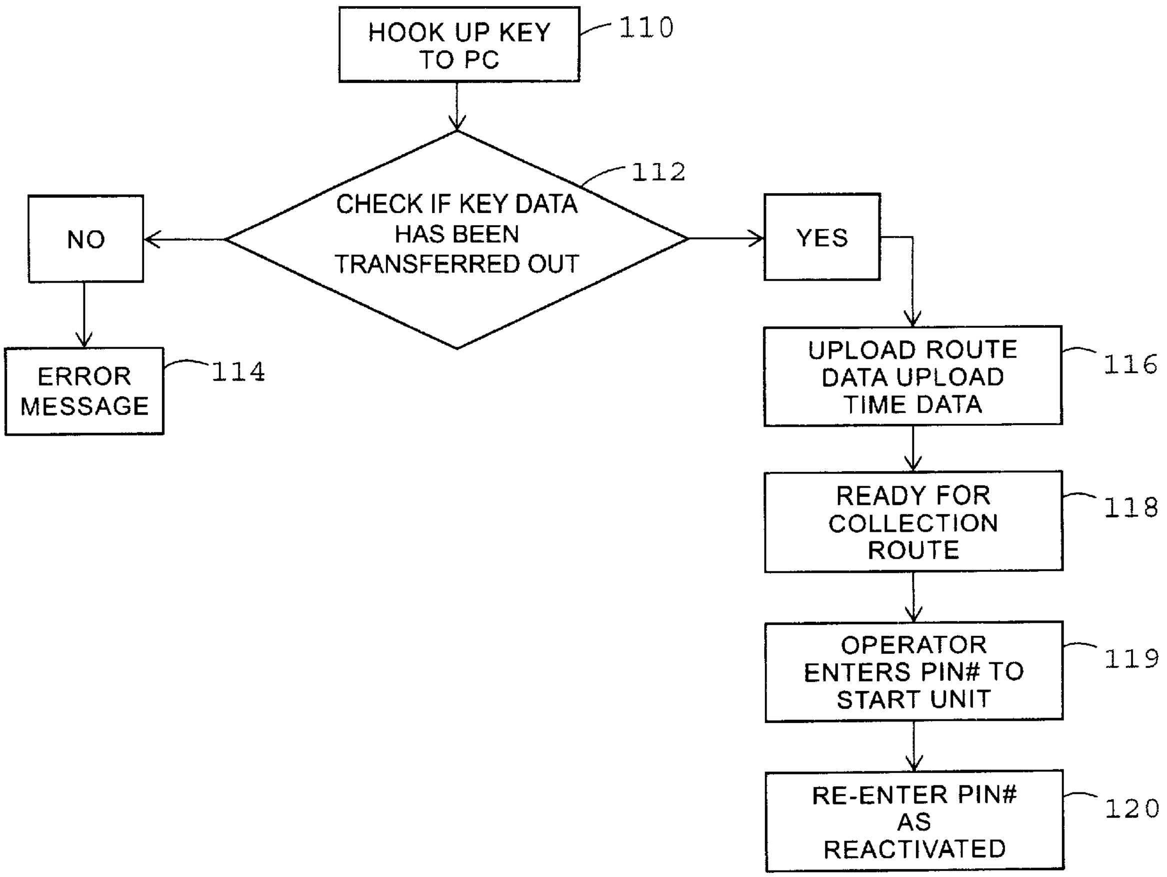
FIG. 12 is another flow chart, indicating transfer of data between a computer and the microprocessor and data storage on the key of FIG. 7.

The flow chart of FIG. 12 shows the transfer of data between the key 52 (FIG. 7) and a management computer or the main computer, which may be a PC, not specifically shown in the drawings. A block 110 shows that the key is connected to the computer or PC, via the data connection or port 64. Upon the operator's returning to the office or central location, the information concerning what locks have been opened is first downloaded to the PC, that step not being shown in FIG. 12. Other data can be downloaded as well, such as the amount of money collected at each stop on the route, in the case where the parking meters or other coin locks have a means of storing this data. Such data can be transferred to the conductive path of the lock by use of an extending wire as disclosed in copending Ser. No. 836,206, U.S. Pat. No. 5,367,295, incorporated herein by reference.

FIG. 12 indicates in the block 112 that the PC first checks to see if the key's route data has been transferred out. If no, an error is indicated (114), since new route data should not yet be entered. If yes, the PC transfers new route data into the key's database, and also uploads time data as indicated at 116, i.e. dates and times or periods within which the locks are permitted to be opened. Authorized operators' PIN numbers can also be uploaded at this point. The route data will again include a set of locks which are to be opened in an operator's route. Once the new data is uploaded, the key 52 is ready for use in a collection route (or use in another series of similarly-keyed locks). This is indicated at 118. As noted, the operator enters his PIN number (119) to start the key unit, and is prompted to reenter the PIN number (block 120) when the system needs to be reactivated, which can be based on time passage or on the microprocessor's randomly requesting re-entry of the PIN number.

The system of the invention can be slightly modified to operate in other ways, the most important features being that the blocking pin 38, solenoid 36 and operating devices are located within the lock itself, without requiring any further space around the lock or in a lock casing; in the case of a conventional rotatable cylinder plug and surrounding cylinder shell, all components are contained on the plug itself, with only an opening, groove or recess required to be provided in the cylinder shell, as outlined above. One example of a different operating mode involves manual entry of each lock's ID, by the operator. For instance, if a series of parking meters bear exterior, readable numbers, the system could require the operator to enter the parking meter number on the keypad 60 of the key, as each parking meter is approached. A prompt can be issued on the display. The database can be similar to that described above, with an addressable switch code tied to each parking meter number within the database. The decisions as to authorized opening can also be the same, made by the microprocessor within the key head. If opening of the lock is authorized, the key can send a signal to the addressable switch 34 (comprising that switch's ID code as looked up in the database), causing the switch to turn "on" and thus powering the solenoid 36 to retract the pin 38. In this case the readable ID device 32 would not be needed, but nonetheless can still be included within the lock (on the cylinder plug 24 in the illustrated embodiment), so that the system can be capable of several different modes of operation. Protection against external reading of the addressable switch code can be included as described above. The external loading of data into the data port 64 can include programming or changing mode via the key's processor 72, to indicate whether numbers are to be manually entered or whether they should be read automatically as described earlier. The operation is based on the same master-slave relationship as described above, but with manual entry of lock numbers rather than automatic reading of the lock's ID.

Figure 17:
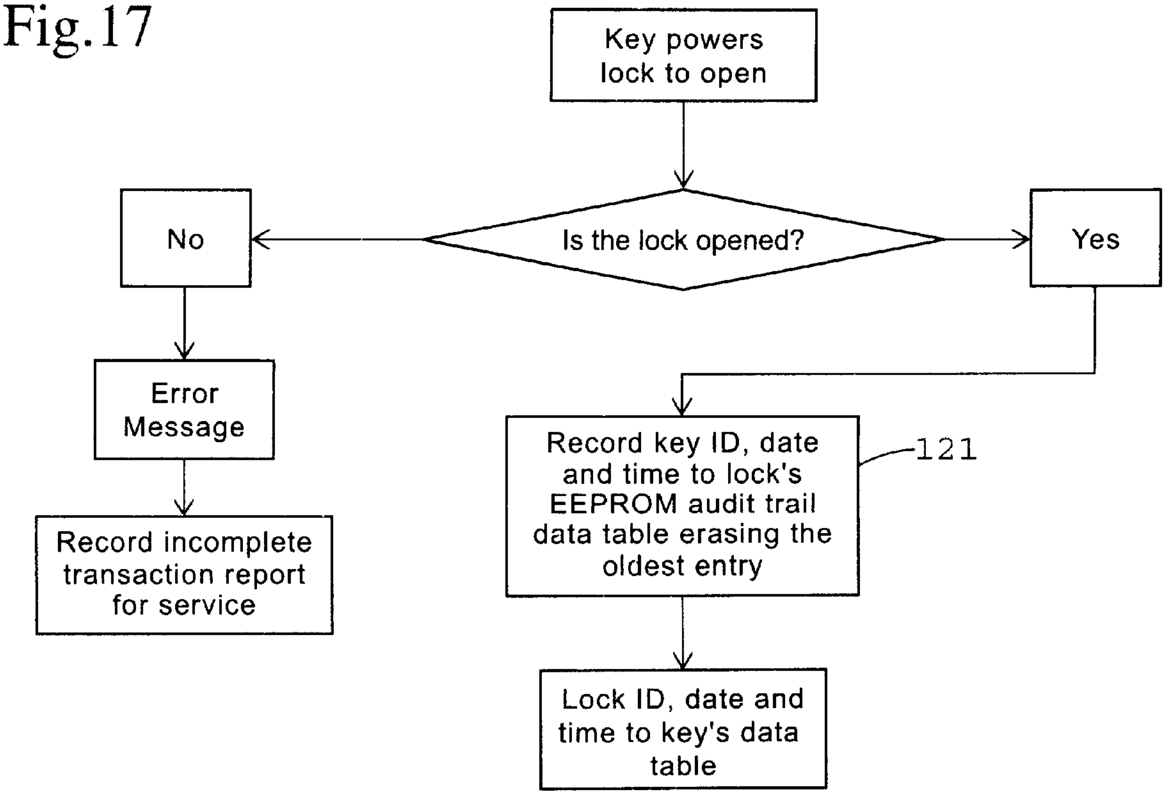
FIG. 17 is a further flow chart outlining programming of the system in a modified embodiment in which a plurality of keys held by different persons can access a lock.

As outlined above, the system of the invention embraces additional forms in which coin operated devices such as parking meters can be electronically audited as to the amount of money being collected, and in one preferred embodiment can have provision for storing money data for a further audit if necessary. In addition, the system can include a simple modification which enables recording of entry data, as to when each entry occurs and by which key. This latter feature enables an audit trail of what persons have opened a particular lock, such as in the case of a slot machine from which money is periodically removed. A flow chart for this routine is shown in FIG. 17. The block 121 in FIG. 17 indicates that, when the lock has been opened, the key ID feeds to the lock's rewritable EEPROM ($U_3$ in FIG. 10 or 10A) the date, time and key ID number. This can be retained in the EEPROM with a selected number of prior such recorded entries in a revolving record, with the oldest entry erased each time a new one is recorded. The data can then be read by an audit device when an audit is designed.

Figure 7A:
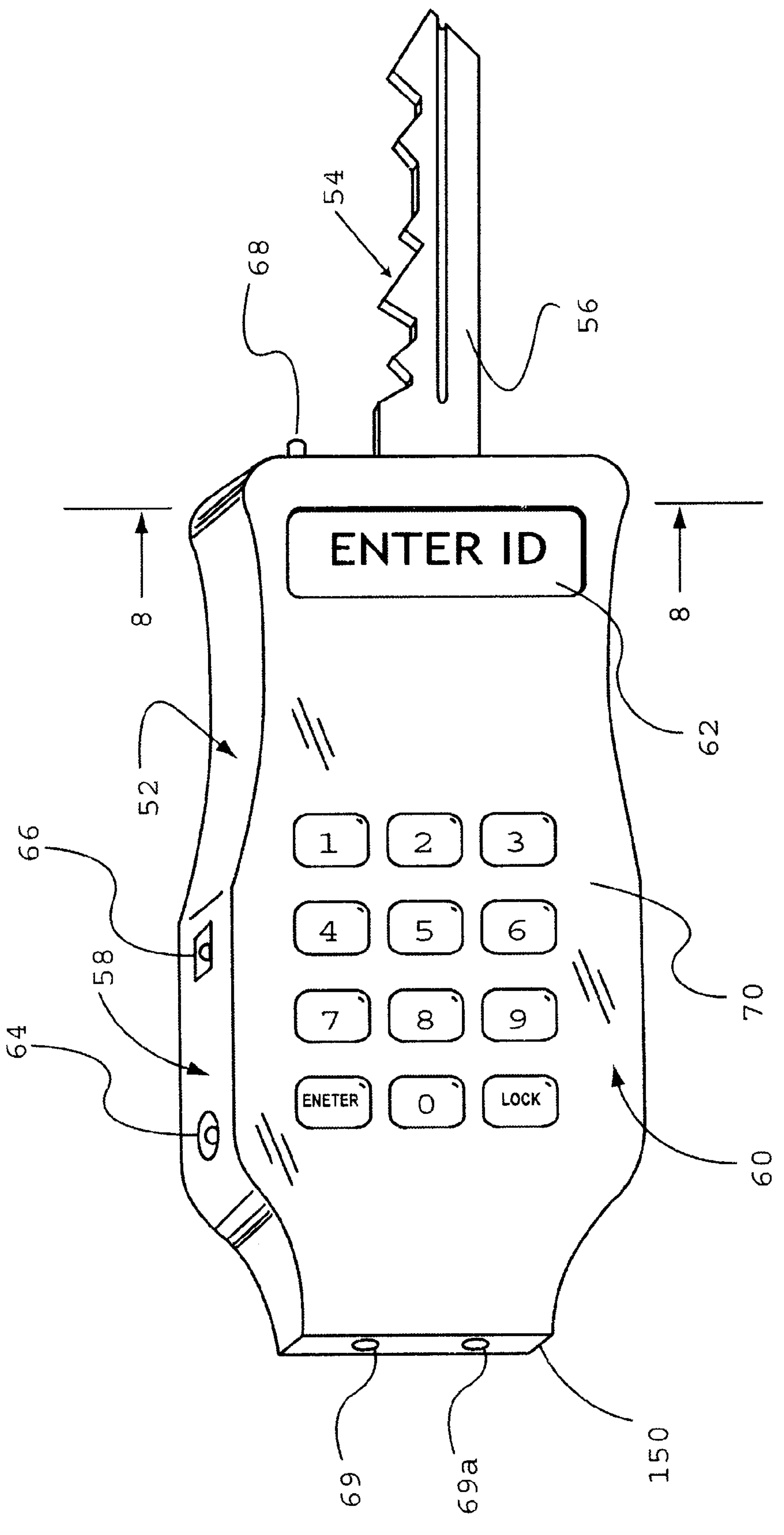
FIG. 7A is similar to FIG. 7, with a modified form of data transfer device on the key head.
Figure 14:
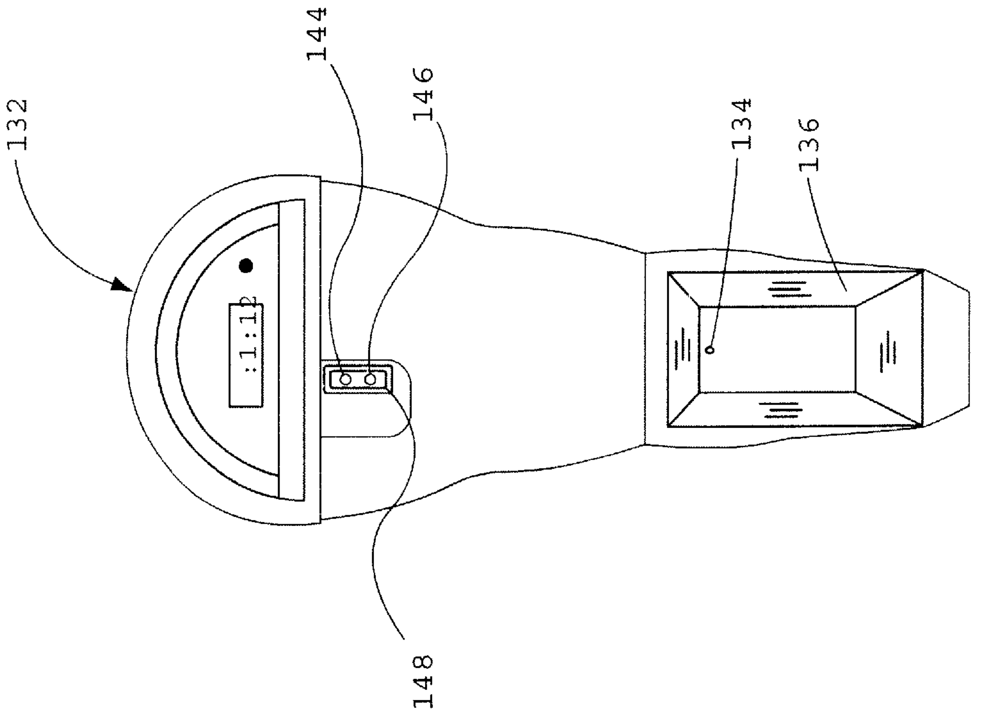
FIG. 14 is a view similar to FIG. 15, with the data transfer apparatus slightly modified.
Figure 13:
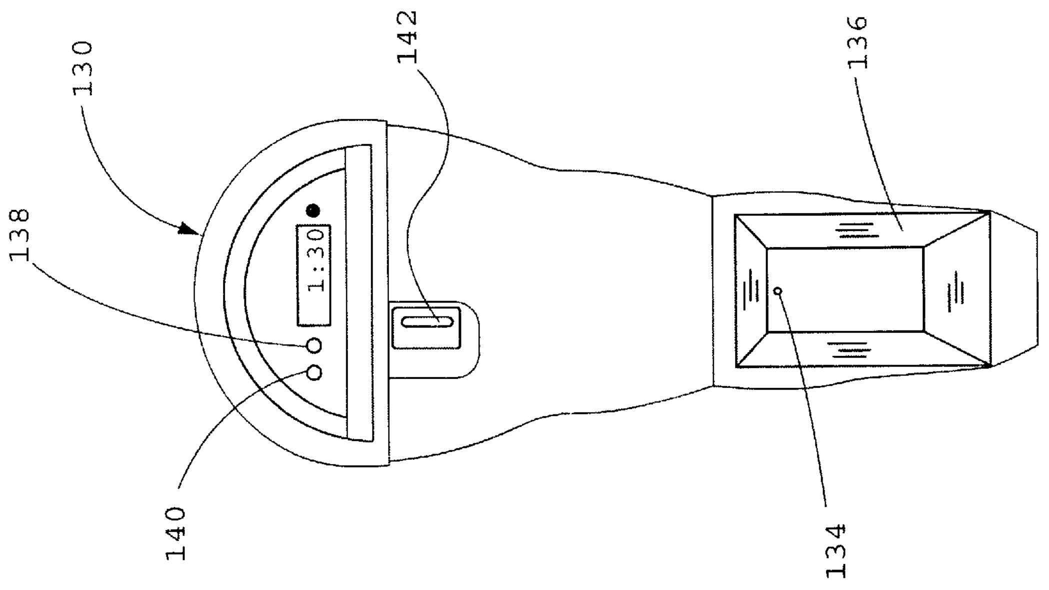
FIG. 13 is an elevation view showing a parking meter having money totaling and data transfer capability.

FIGS. 13 and 14 show coin collecting implements, namely parking meters generally of a type already in use, with provision for counting and recording total money inserted, between collections. The parking meters 130 and 132 are also fitted with lock apparatus of the invention, not seen in FIGS. 13 and 14 but indicated at 134, on coin lock boxes 136. These parking meters 130 and 132 may have coin totalling and data communicating features as in the parking meters marketed under the trademark APM by POM Inc., P.O. Box 430, Russelville, Ark. On the parking meter 130, an infrared emitter 138 and receiver 140 are shown. Within the parking meter is a money counting device which accumulates the total of all coins dropped through the coin slot 142. This recorded information is available to be read via the infrared devices 138, 140. The meter 132 in FIG. 14 has similar infrared transfer devices 144, 146 tecessed within the coin slot 148. These features cooperate with the present invention via the infrared data transfer device as shown in FIGS. 7 and 7A. The key 52 of FIG. 7 has infrared data ports 69 and 69*a*, which the user places alongside the infrared ports 138 and 140 in FIG. 13, generally in registry. A signal is sent from the key device 52 (a triggering button can be provided for this purpose, or a simple combination of keys on the keypad can be pushed to generate an infrared start signal). The parking meter electronics receive the signal from the key's infrared device signifying that data should be emitted from the emitter on the parking meter, the data stream is emitted and it is read by the infrared interface device (69, 69*a*) on the key. This information is fed to the microprocessor in the key, as indicated in FIG. 9.

The reading of the data by infrared interface, and the storing of such data in a hand-held device (not a key) is known in the POM device cited above, and also in parking meter equipment marketed by Duncan Industries, also of Arkansas. As is known from those marketed devices, the counter within the parking meter (130 or 132) will reset to zero when the information has been sent to and received by the recording device. In the case of the parking meter 132 of FIG. 14, the key of FIG. 7A is used. In this case the key has a narrowed upper end 150 which is sized to fit into the parking meter coin slot 148. The concept of providing a narrow reader for entering the coin slot, to avoid interference by ambient light conditions, is also well known (not on a key head). The emitter/receiver combination 144, 146 recessed within the coin slot of the meter 132 is read via the infrared ports 69, 69*a* shown in FIG. 7A at the narrow end 150 of the key head.

Figure 15:
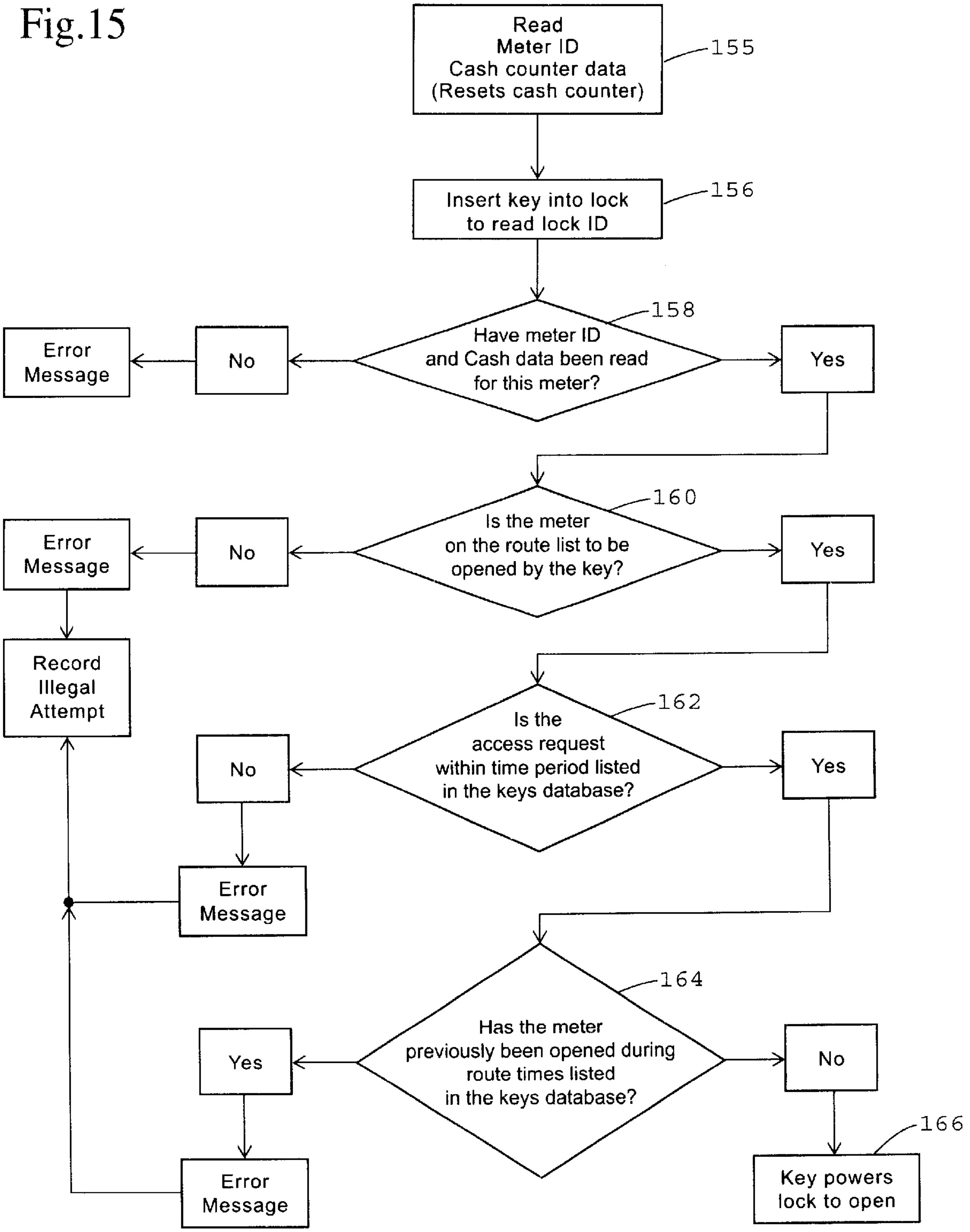
FIG. 15 is a flow chart outlining steps in use of the mechanical/electronic key and lock of the invention (including programmed steps in the microprocessor), in an embodiment wherein a coin storage device such as a parking meter has capability of storing and transferring total money data.

FIG. 15 schematically indicates operator steps and programming for the key device (FIGS. 7, 7A and 9) of the invention for a system in which a cash counter is incorporated in the locked device, such as the parking meters of FIGS. 13 and 14. The indicated routine is similar to that of FIG. 11, with the additional features regarding cash counter data, but some of the details shown in FIG. 11 are omitted from FIG. 15. As in the routine of FIG. 11, the routine of FIG. 15 can include entry of the operator's PIN number and it includes details such as sending the address code for the addressable switch, to power the solenoid, etc. as noted in FIG. 11, when the decision has been made to permit opening of the lock.

In FIG. 15 the first block 155 shows that the operator first reads the data from the parking meter regarding total cash contained in the coin box. As noted above, this involves placing the key head infrared interface adjacent to the meter's infrared interface 138, 140 (FIG. 13), or into the slot 148 for interfacing with the infrared devices 144, 146 (FIG. 14). When this interface is made, the key held by the operator reads the meter ID as part of the infrared data stream, as indicated in the block 155, as well as receiving the cash counter data. As in the prior cash counting parking meter devices, this effects the resetting of the cash counter.

The operator next inserts the key into the lock, to read the lock ID as in the earlier-described embodiment. This is shown in the block 156 of FIG. 15. Next, as indicated in the decision block 158, the key determines whether the meter ID and cash data have been read and are stored in the key. If yes, the key then queries (block 160) whether this meter is on the route list to be opened by this key. If yes, the key in preferred embodiments queries whether this access attempt is within the time period allowed, according to the key's database. If so, it is then determined whether the meter has previously been opened during route times listed in the key's database. Normally only one accessing of the meter is permitted during this period. Thus, if the meter has not previously been opened during the route times listed, the key powers the lock to open, as in the block 166. This of course involves some of the program steps shown in FIG. 11.

The flow chart therefore shows that the key device (FIGS. 7, 7A, 9) retrieves cash counter data representing total money stored in the meter at the time of collection, along with the meter ID for each parking meter (or other such route collection coin operating device). The key's database retains this information until downloaded at a central PC (such as represented in FIG. 12). The total cash which should have been collected by the collection operator from each meter is therefore tabulated in the central PC, providing an audit of the operator's collection route. If any skimming of coins has taken place, this should be revealed by a comparison of cash delivered to the record of cash contained in each meter before collection. As shown in the flow chart of FIG. 15, the operator cannot open the lock to collect the coins unless the meter ID and cash data have been read and entered into the key.

Figure 16:
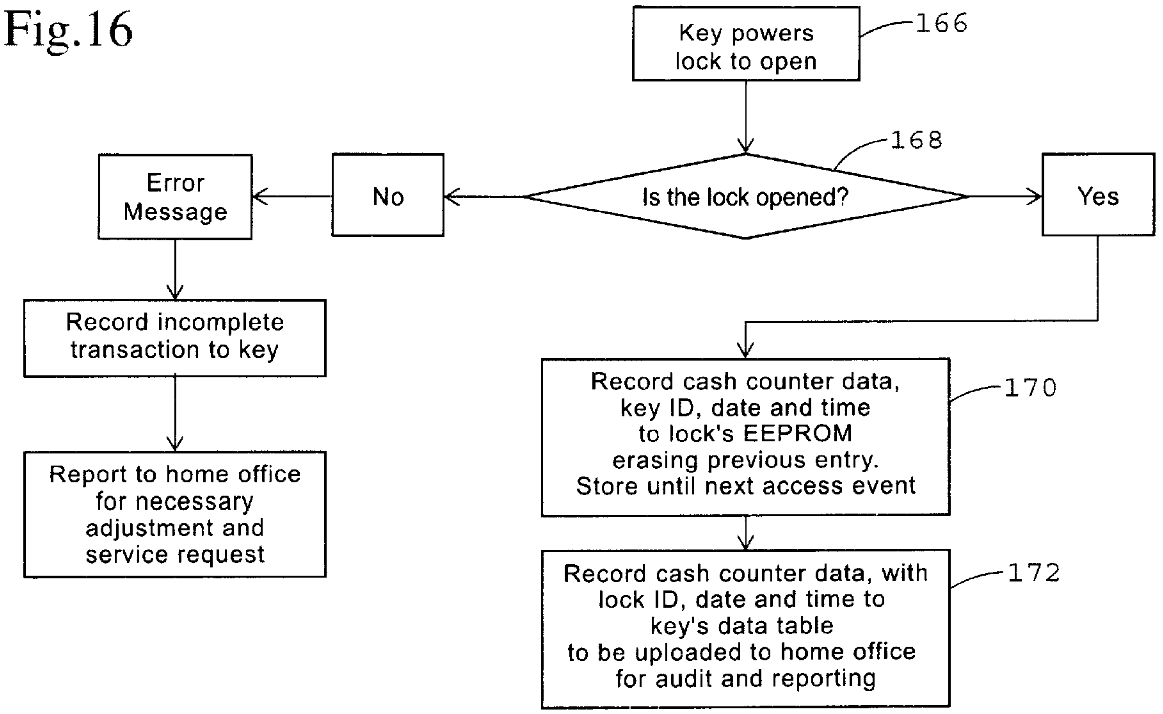
FIG. 16 is another flow chart, showing a further procedure, continued from the chart of FIG. 15, in a case where the coin storage device includes a further auditing feature.

FIG. 16 shows a routine continuing from FIG. 15, for the case in which the parking meters (or other coin operating devices) are fitted with a secondary audit feature. As described above, such a feature enables a subsequent audit of the route, revealing the amount of cash which should have been collected, in the event the collection operator loses (or allegedly loses) the key. In this embodiment, the cash counter data read by the head of the key is actually fed back into the lock, to a memory device in the lock ($U_3$ in FIGS. 10 and 10A), for subsequent retrieval if needed for a subsequent audit. FIG. 16 thus shows in the block 166 the key powering the lock to open, continuing directly from the block 166 in FIG. 15 for this particular preferred embodiment. As noted in the blocks 168 and 170, if the key successfully powers the lock to open, the key's microprocessor then sends to the lock's rewritable EEPROM the cash counter data, the key ID number, the date and the time. The meter ID number can also be fed into the EEPROM, but this could already be stored there for the particular meter involved. As shown in the block 170, this transfer of data effects the erasing of the previous data in the rewritable EEPROM, that previous data relating to the previous collection at the same parking meter. The new data are stored until the next access event, thus providing data for a post-collection audit if necessary.

The block 172 shows that the cash counter data, lock ID, date and time are transferred to the key's data table, thus enabling these data to be uploaded to the home office computer for audit and reporting.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. A mechanical key device formed as a solid unit and fitted for insertion into a lock cylinder, comprising;

(a) a key blade with mechanical bitting to fit a pattern of a lock cylinder, (b) a key head fixed to the key blade, (c) the key head including electrical contact means for engaging with a contact of a lock cylinder, leading to electronics in the lock cylinder and to an electrically-operated blocking device in the lock cylinder, in a one-wire bus connection, and a battery in the key head, (d) microprocessor means in the key head, powered by the battery, and data storage means connected to the microprocessor means, (e) a keypad on the key head with means for data entry, (f) the battery being connected to power the microprocessor means and keypad and data storage means, and (g) the microprocessor means and data storage means having means for reading an electronic ID code of a lock when the one-wire bus connection is made, and for looking up the read ID code in the data storage means and for making a yes or no decision, based on the content of the data storage means, as to whether the lock is authorized to be opened, and if so, for sending a prescribed data signal to the lock electronics and power from the battery to the lock's blocking device, to allow opening of the lock.

2. The apparatus of claim 1, wherein the data storage means has stored a PIN number for a particular authorized user of the key and the microprocessor means including means for preventing use of the key to open the lock in the case wherein a holder of the key does not enter into the keypad a PIN number which matches the stored PIN number.

3. The apparatus of claim 1, wherein the key head further includes at least one data port and means enabling downloading data from the data storage means to a central computer when the data port is connected to the central computer.

4. The apparatus of claim 1, wherein the key head further includes display means for displaying information to the keyholder, under the control of the microprocessor means.

5. A mechanical key device formed as a solid unit and fitted for insertion into a lock cylinder, comprising;

(a) a key blade with mechanical bitting to fit a pattern of a lock cylinder, (b) a key head fixed to the key blade, (c) the key device including electrical contact means for engaging with a contact of a lock cylinder, leading to electronics in the lock cylinder and to an electrically-operated blocking device in the lock cylinder, in a one-wire bus connection, (d) a battery in the key head, (e) microprocessor means in the key head, powered by the battery, and data storage means in the key head connected to the microprocessor means, (f) the battery being connected to power the microprocessor means and data storage means, and (g) the microprocessor means and data storage means having means for reading an electronic ID code of a lock when the one-wire bus connection is made, and for looking up the read ID code in the data storage means and for making a yes or no decision, based on the content of the data storage means, as to whether the lock is authorized to be opened, and if so, for sending a prescribed data signal to the lock electronics and power from the battery to the lock's blocking device, to allow opening of the lock.

6. A series of corn collecting implements with lock devices in combination with a mechanical key device formed as a solid unit and fitted for insertion into a lock cylinder, comprising:

mechanical kpy device including:

(a) a key blade with mechanical bitting to fit a pattern of a lock cylinder, (b) a key head fixed to the key blade, (c) the key device including electrical contact means for engaging with a contact of a lock cylinder of a lock device, leading to electronics in the lock cylinder and to an electrically-operated blocking device in the lock cylinder, in a one-wire bus connection, (d) a battery in the key head, (e) microprocessor means in the key head, powered by the battery, and data storage means in the key head connected to the microprocessor means, (f) the battery being connected to power the microprocessor means and data storage means, (g) the microprocessor means and data storage means having means for reading an electronic ID code of a lock device when the one-wire bus connection is made, and for looking up the read ID code in the data storage means and for making a yes or no decision, based on the content of the data storage means, as to whether the lock device is authorized to be opened, and if so, for sending a prescribed data signal to the lock cylinder electronics and power from the battery to the lock's blocking device, to allow opening of the lock device, and (h) an infrared reading device on the key head connected to the microprocessor means and capable of reading an infrared signal emitted by the implement when held adjacent thereto for storage in the microprocessor means;

the coin collecting implements and lock devices compromising:

each lock device having a said lock cylinder with said electronics and said electrically-operated blocking device, each lock device having an electronic ID storage device as a part of said electronics and storing said electronic ID code, the lock device also having a mechanical bitting pattern of said lock cylinder fitted to the key blade, each lock device securing a coin storage area of said coin collecting implement, each coin collecting implement further including a coin counter device for electronically counting the coins entering the coin storage area and the coin counter device having means for electronically storing a total representing the number of coins which are stored, and the implement additionally including infrared transmitter means connected to the coin counter device for emitting an infrared signal representing the number of coins collected in the coin storage area, said coin counter device and infrared transmitter means being separate and independent and not connected to the lock device or the lock electronics.

7. The apparatus of claim 6, wherein the blocking device of the lock cylinder is positioned to prevent rotation of the key blade in the lock cylinder until said prescribed data signal is sent to the lock electronics, with a solenoid operating the blocking device to retract the blocking device when power is sent to the blocking device from the key device, upon the lock being authorized to be opened and the prescribed data signal being received in the lock device.

8. The apparatus of claim 7, wherein each coin collection implement has a coin slot for inserting coins to reach said coin storage area and wherein the coin slot is recessed and the infrared transmitter means is located within the coin slot, and the key head including a projection shaped to be inserted partially into the coin slot, the projection carrying the infrared reading device.

9. The apparatus of claim 6, wherein the microprocessor means in the key head includes means for withholding said prescribed signal until after a user of the key has caused the key head to read the infrared signal emitted by the infrared transmitter means, containing data relating to total coins stored in the coin storage area.

10. The apparatus of claim 6, wherein the lock device additionally includes an EEPROM capable of recording the transactions comprising openings of the lock device as transmitted in data from the key device, the data stored by the EEPROM also including a coin total as read into the key from the infrared transmitter means of the coin counter device and also including ID data from the key to identify the key which accessed the lock device.

11. The apparatus of claim 6, wherein the electronic ID storage device in the lock device comprises an EEPROM with capability of changing the stored electronic ID code on receipt of a signal from the key device via said one-wire bus connection, whereby the electronic ID code of the lock device can be changed for security purposes in case of a lost or stolen key device.

12. The apparatus of claim 6, wherein the key head further includes a keypad with means for data entry into the microprocessor means, and wherein the data storage means has stored a PIN number for a particular authorized user of the key and the microprocessor means including means for preventing use of the key device to open the lock device in the case wherein the holder of the key device does not enter via the keypad a PIN number which matches the stored PIN number.

13. The apparatus of claim 5, in combination with a series of lock devices each having an electronic ID storage device storing said electronic ID code, the lock device also having a mechanical bitting pattern fitted to the key blade.

14. The apparatus of claim 6, wherein the lock device additionally includes an EEPROM capable of recording at least one transaction comprising accessing of the lock device, by reading data from the key device, said data from the key device including a unique identification code for the particular key device, whereby an audit can be performed on the lock devices to determine which key device has been used to access the lock device.

15. The apparatus of claim 14, wherein the data from the key device, stored by the EEPROM of the lock device, further includes date and time of access.

* * * * *

UNITED STATES PATENT AND TRADEMARK OFFICE

CERTIFICATE OF CORRECTION

PATENT NO. : 6,552,650 B1
DATED : April 22, 2003
INVENTOR(S) : Asil T. Gokcebay and Yucel K. Keskin It is certified that error appears in the above-identified patent and that said Letters Patent is hereby corrected as shown below:

Column 16,
Line 23, “corn” should be -- coin --
Line 27, “kpy” should be -- key --

Signed and Sealed this

Twenty-sixth Day of August, 2003

JAMES E. ROGAN
*Director of the United States Patent and Trademark Office*